Dec. 28, 1954   R. F. BECKER   2,698,146
RATCHET STRUCTURE FOR CORD REELS
Filed July 19, 1952
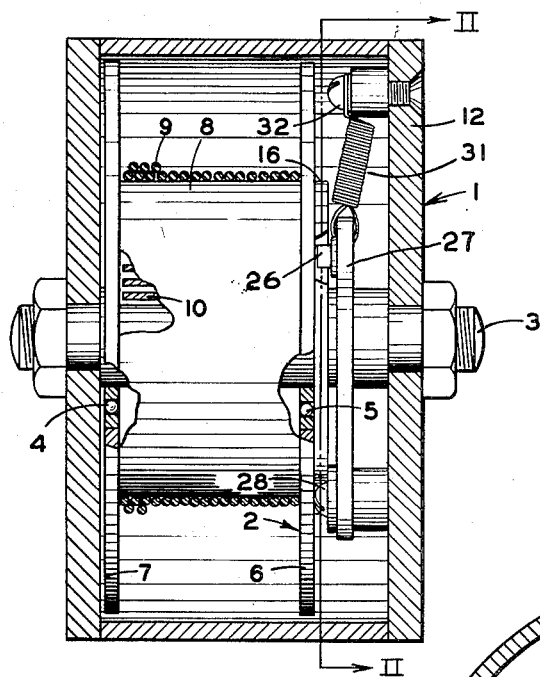
fig. 1
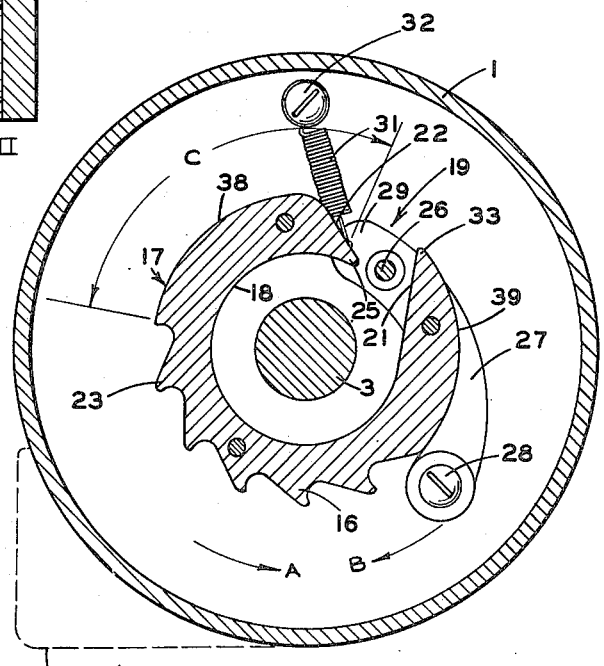
fig. 2
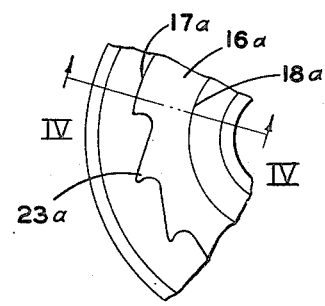
fig. 4
fig. 3
INVENTOR.
RODGER F. BECKER
BY
ATTORNEY ated Dec. 28, 1954

2,698,146

RATCHET STRUCTURE FOR CORD REELS

Rodger F. Becker, Kalamazoo, Mich.

Application July 19, 1952, Serial No. 299,810

4 Claims. (Cl. 242—107)

This invention relates to ratchet structure adaptable for use with a cord reel and particularly to a type thereof providing one path in which a pawl is caused to travel during an unwinding operation which path is provided with pawl engaging means, and providing another path in which the pawl is caused to travel when rewinding which latter path is free from pawl engaging means.

In providing ratchet control for a spring-biased cord reel, wherein the spring exerts a constant pressure urging the reel in a winding direction, there is a constant problem of proper control of the pawl for permitting it to release the ratchet at a desired time but preventing it from so releasing the ratchet at all other times. Although many devices have been proposed for holding a pawl inoperative during the rewinding operation of a reel, insofar as I am aware each of these require the operation of some form of movable mechanism which in actual practice may fail to work properly and thereby the reel does not rewind as it should.

In attempting to find a ratchet and pawl construction which would eliminate such failures and irregularities in operation, I have conceived the idea of providing two paths in which the pawl may travel, one path for travel during the unwinding operation and the other path for travel during the rewinding operation. The first, or unwinding, path is provided with a plurality of pawl engaging, ratchet-type, teeth which permit the ratchet to move with respect to the pawl in an unwinding direction but which engage the pawl and prevent rewinding and thereby hold the reel in a selected position with a given amount of cord unwound therefrom. The return path is free from obstructions to movement of the pawl therealong. It is so connected to the unwinding path that the pawl is readily led into it at the desire of an operator and when in such position the reel will rewind rapidly and without interference. The entire structure is sufficiently free of moving parts that the likelihood of failure is reduced to a minimum.

Accordingly, a principal object of the invention is to provide a pawl and ratchet construction having a maximum of simplicity and a minimum of moving parts whereby a high degree of accuracy in operation may be obtained.

A further object of the invention is to provide a pawl and ratchet construction having one path for the travel of the pawl in an unwinding direction, said path being provided with ratchet teeth, and another path for the travel of the pawl when the reel is turning in a rewinding direction, which latter path is free from means capable of engaging the pawl or otherwise interfering with the rewinding operation.

A further object of the invention is to provide ratchet and pawl construction which will operate equally successfully in any position of the reel.

A further object of the invention is to provide ratchet and pawl construction, the operation of which will be independent of the speed of rotation of the apparatus in either a rewinding or unwinding direction.

A further object of the invention is to provide a ratchet and pawl construction for a cord reel which will operate equally effectively regardless of the amount of cord which is unwound from the reel at any given time.

A further object of the invention is to provide a ratchet and pawl construction which requires no special electrical connections or other means for independently operating the pawl.

A further object of the invention is to provide ratchet and pawl construction for application to a cord reel which will be strong and sturdy.

Other objects and purposes of the invention will be apparent to persons acquainted with equipment of this general type upon a reading of the following disclosure and inspection of the accompanying drawing.

In the drawing:

Figure 1 is a partially broken view in central section of a typical form of cord reel and showing the application thereto of the ratchet and pawl construction of the invention.

Figure 2 is a section taken on the line II—II of Figure 1.

Figure 3 is a fragmentary showing of a modification of the invention.

Figure 4 is a section taken on the line IV—IV of Figure 3.

In general

In general, my invention comprises providing a ratchet defining a pair of annular paths, and providing a connecting channel between said paths. One of said paths is provided with a plurality of ratchet teeth and the other of said paths is smooth, and the connecting channel between said paths is provided with cam surfaces at each side thereof. A ratchet pin is resiliently supported in such a manner that it normally occupies a position intermediate said paths but the cam structure on one side of said channel will move said pin into the path provided with the ratchet teeth when the reel is rotated in an unwinding direction and, by proper manipulation of the apparatus, the cam structure on the other side of said channel will move said ratchet pin into the smooth path when said reel is to be rotated in a rewinding direction.

Detailed description

Inasmuch as the ratchet and pawl construction of the invention may be applied to a wide variety of reels, providing only they are equipped with means for imposing thereon an urging for rotation in a rewinding direction, the following description utilizes a somewhat simplified and schematic illustration of the reel portion. No attempt is made to disclose the reel in detail and the description thereof indicates only the essential operating parts of conventional reel structure.

Referring now to Figure 1 there is shown a housing 1 within which is mounted a rotatable reel 2, said reel being mounted upon the fixed shaft 3 by the bearings 4 and 5. Said rotatable reel 2 comprises a pair of rotatable flanges 6 and 7 which are mounted upon either end of a core or drum 8. The cord, which said reel is designed to handle, is indicated at 9 and is wrapped around the drum 8 in a conventional manner. Said cord 9 may or may not be of electrically conductive character but if it is, further means may be added for energizing same, such as the means illustrated in United States Patent No. 2,640,113. Conventional means are provided for permitting the exit of said cord 9 from said reel, such as the means also indicated in United States Patent No. 2,640,113 and indicated by the broken line 11 in Figure 2.

The spring 10 is affixed within said reel in a conventional manner to urge rewinding thereof.

Turning now to the details of the ratchet and pawl construction, the same may be mounted between the rotating flange 6 of the rotatable reel 2 and the non-rotating wall 12 of the housing 1. It will be appreciated that the selection of rotating and non-rotating elements in the description hereinafter appearing is arbitrary and for the sole purpose of illustration, and that in actual practice said parts may be reversed if desired.

The ratchet portion of the construction is indicated in Figure 2 by the ring 16. Said ring has an outer edge 17 defining an outer path and it has an inner edge 18 defining an inner path. A channel or slot 19 provides communication between the outer path and the inner path.

The cam edge 21 of said channel 19 tapers from the inner edge 18 to the outer edge 17 to provide a cam surface for purposes appearing further hereinafter. The edge 22 defining the other side of the channel 19 tapers from the outer edge 17 to the inner edge 18 to provide another cam surface for purposes appearing hereinafter. Each of said cam edges 21 and 22 is preferably substantially tangent to the circle defined, excepting for the channel 19, by the inner edge 18.

The outer edge 17 has a plurality of ratchet teeth 23 which are tilted in a direction to permit movement of a pawl therealong in the direction indicated by the arrow A appearing in Figure 2 and to prevent relative movement of said pawl in the opposite direction indicated by arrow B (Figure 2).

The pawl 26 comprises a pin supported by the arm 27 and extending toward the rotatable flange 6 sufficiently to bear against the edges of the ring 16. Said arm 27 is pivotally affixed to the housing by a screw 28 and the free end 29 of said arm 27 is held by the spring 31 and a screw 32. Said screw 32 is fastened to the nonrotating wall 12 of the housing 1. The shape of said arm 27, and the position thereon of the pawl pin 26, is such that when the pawl pin 26 is disposed within the channel 19 it will, in response to the urging of the spring 31, assume a position intermediate the radius of the inner edge 18 and the radius of the outer edge 17 between the tip 33 of the cam edge 21 and the tip 25 of the cam edge 22.

Figure 3 shows a modification of the structure shown in Figure 2 in which the parts are numbered by numerals corresponding to those appearing in Figure 2. However, as best shown in Figure 4, this form of the invention has a fully defined inner path 34 and a fully defined outer path 36. As the description of the operation of the device proceeds, it will be recognized that these forms are functionally equivalent to each other and that one of the purposes of presenting the form shown in Figures 3 and 4 is to illustrate further the essential operation of the preferred form appearing in Figure 2.

In affixing the cord to the rotatable reel 2, which may be done in any conventional manner, it is preferred, for reasons appearing hereinafter, that the cord be so fastened that when it is pulled to its fully unwound condition, some portion of the arc indicated by the letter C will be in radial alignment with the pawl pin 26.

Operation

In considering the operation of the foregoing described apparatus and commencing with the reel in its fully wound position, it will first be assumed that the reel is to be unwound. This will rotate the ring 16 in the direction indicated by the arrow B with respect to the pawl pin 26, which pin does not move circumferentially with respect to the housing 1. Due to the relative radial positioning of the pawl pin 26 and the tip 25 of the cam surface 22, namely, said tip being radially inward of the pawl pin when it is in the channel 19, said cam edge 22 will engage the pawl pin 26 and move it radially outwardly against the edge 17. As the unreeling continues, the ring 16 will continue to rotate in the direction indicated by the arrow B and such movement of said ring will move the ratchet teeth 23 past said pawl pin 26, which will be possible due to the direction of inclination of said ratchet teeth. When the tip 33 passes under said pawl pin 26 said pin will again be enabled to drop into the channel 19 from which it will again be lifted by the cam edge 22 to repeat the operation. Thus, so long as rotation of said reel in an unwinding direction continues, the pawl pin 26 will merely ride on the outside of the ring 16 and will not interfere with the unwinding operation.

It will be noted that there is provided untoothed zones 38 and 39 between the channel 19 and the portion of the ring having the teeth 23. By this construction, the sound of the pawl pin 26 passing across the teeth 23 will be sufficiently characteristic that the operator will have no difficulty in stopping the reel adjacent one of said teeth and effecting engagement therein when the unreeling operation is completed and the spring 10 is permitted to rotate the reel in the reverse, or rewind, direction.

When it is desired to rewind the reel, the cord is again pulled sufficiently to draw the tip 33 past the pawl pin 26 and enable said pawl pin to drop into the channel 19. The cord is then released and the spring 10 rotates the reel and the ring 16 in the direction indicated by the arrow A. Thus, the cam edge 21 engages the pawl pin 26 and guides it into the path defined by the inner edge 18 (the inner path 34 appearing in Figure 4). As the tip 25 passes the pawl pin when the ring is rotating in the direction of the arrow A, said pawl pin merely moves radially outwardly momentarily until it is again engaged by the cam edge 21 and again guided into the path defined by the inner edge 18 of the ring. Thus, without requiring any retraction or other mechanical control of the pawl, the pawl is rendered wholly inoperative and the rewinding, takes place.

It will be recognized that the rewinding operation may be stopped at any point by the operator grasping said cord and manually stopping same after which the cord may be drawn outwardly a short distance in order to lift the pawl pin by the cam surface 22 into the path defined by the outer edge 17 of the ring 16 and it may again be caused to engage one of the ratchet teeth 23 and hold said reel against further rewinding.

Thus, the reel may be wound and unwound merely by the operator's manipulation of the cord wrapped thereon and no separate operations are required to engage or disengage a pawl.

The apparatus may be secured against a locking condition in its extreme unwound position by so placing the end of the cord, with respect to the reel, that when the cord is fully unwound from the reel the pawl pin 26 will be located with respect to the ring somewhere within the arc C. Thus, at this point the cord may be merely released and the spring will move the reel and the ring in a rewind direction and there are no teeth in a position to hold the ring against the pawl pin prior to the pawl pin's dropping into the channel 19.

It will be appreciated that various modifications may be made in the structure herein disclosed and described but that said variations will be included within the scope of the hereinafter appended claims excepting as said claims may by their own terms expressly limit otherwise.

I claim:

1. In apparatus of the character described, the combination comprising: a shaft; a reel mounted for rotation on said shaft; spring means operative between said shaft and said reel for rotating the reel in one direction; means defining a substantially circular inner path concentric with said shaft and disposed between a pair of parallel planes; means defining a substantially circular outer path spaced radially outwardly from and concentric with said inner path and also disposed between said planes; means defining a channel between said paths, said channel being substantially tangent to said inner path; a follower extending through at least one of said planes; means outside of said planes supporting said follower for movement between said inner and outer paths, said supporting means being pivotally mounted with respect to said means defining said paths; means along said outer path, spaced from said channel, permitting movement of said follower in one direction only along said outer path; and resilient means urging said follower into a position between said inner and outer paths.

2. In apparatus of the character described, the combination comprising: a shaft; a reel mounted for rotation on said shaft; spring means operative between said shaft and said reel for rotating the reel in one direction; a substantially circular ring concentric with said shaft, said ring having radially inner and outer edges and a slot communicating between said edges, the opposing faces of said slot being substantially tangent to said inner edge and extending from their respective points of tangency in the same rotational direction, and said outer edge having teeth inclined in said direction and spaced from said slot; a pin extending through at least one of two planes defined by the axial faces of said ring; means outside of said planes supporting said pin for movement between positions of tangency to said inner and outer edges, said supporting means being pivotally mounted with respect to said ring: and resilient means urging said pin into a position radially intermediate said inner and outer edges.

3. In apparatus of the character described, the combination comprising: a reel; means supporting the reel for rotation; spring means operative between said reel and said supporting means for rotating the reel in the rewinding thereof; a substantially circular ring concentric with and mounted upon said reel adjacent said supporting means, said ring having radially inner and outer edges and a slot communicating between said edges, the opposing faces of said slot being substantially tangent to said inner edge and extending from their respective points of tangency in the same rotational direction, and said outer edge having teeth inclined in said direction and spaced from said slot; a pin and means supporting same on said reel supporting means for movement between positions of tangency to said inner and outer edges, said pin extending through the plane defined by the adjacent axial face of said ring and being of less diameter than the width of said slot; resilient means acting upon said pin supporting means for urging said pin into a position radially intermediate said inner and outer edges.

4. In apparatus of the character described, the combination comprising: a spring-loaded reel having a side flange; a housing supporting said reel for rotation and having a side wall which is disposed adjacent to said flange; a substantially circular ring mounted upon and concentric with said flange adjacent to said wall, said ring having radially inner and outer edges and a slot communicating between said edges, the opposing faces of said slot being substantially tangent to said inner edge; means providing a plurality of teeth in said outer edge spaced from said slot, said teeth being inclined in said one direction; an arm pivotally mounted at one end upon said housing side wall for movement about an axis parallel with and spaced from the axis of said reel; a pin secured to the other end of said arm and extending to a point intermediate the planes defined by the axial faces of said ring, said slot being wider than the diameter of said pin; resilient means engaging said arm for resisting movement of said pin from a position radially between said inner and outer edges of said ring to positions of tangency to said inner and outer edges.

References Cited in the file of this patent

UNITED STATES PATENTS

| Number | Name | Date |
|---|---|---|
| 402,686 | Newsom | May 7, 1889 |
| 2,555,560 | Timm | June 5, 1951 |

FOREIGN PATENTS

| Number | Country | Date |
|---|---|---|
| 790,646 | France | Nov. 25, 1935 |